United States Patent
Link et al.

(10) Patent No.: US 6,723,180 B2
(45) Date of Patent: Apr. 20, 2004

(54) FRICTION CLUTCH COMPRISING A FRICTION ELEMENT FORMED OF FLAKE GRAPHITE ALLOY

(75) Inventors: Achim Link, Schweinfurt (DE); Jürgen Kleifges, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 10/027,739

(22) Filed: Dec. 20, 2001

(65) Prior Publication Data

US 2002/0079188 A1 Jun. 27, 2002

(30) Foreign Application Priority Data

Dec. 22, 2000 (DE) .......................... 100 64 248

(51) Int. Cl.⁷ .............................................. C22C 37/00
(52) U.S. Cl. ................... 148/321; 420/27; 192/107 M; 188/251 M
(58) Field of Search ................ 148/321; 420/27; 192/107 M; 188/251 M

(56) References Cited

U.S. PATENT DOCUMENTS 4,230,506 A    10/1980  Clark .......................... 148/3
4,771,524 A    9/1988   Barbezat et al. .............. 29/132

FOREIGN PATENT DOCUMENTS

| EP | 0 272 788 | 6/1988 | ............ C21D/5/00 |
| EP | 0 360 254 A2 | 3/1990 | ............ F16D/69/02 |
| EP | 0 616 040 A1 | 9/1994 | ............ C22C/1/08 |
| JP | 61060855 | 3/1986 | ............ C22C/37/04 |
| JP | 03188239 | 8/1991 | ............ C22C/37/00 |
| JP | 05255730 | 10/1993 | ............ C21D/5/00 |
| WO | WO 93/12359 | 6/1993 | ............ F16D/65/12 |

OTHER PUBLICATIONS

English abstract of Soviet Union patent 1108123A published Aug. 15, 1984.*
English abstractof Soviet Union patent 1454873 published Jan. 30,1989.*

* cited by examiner

*Primary Examiner*—Deborah Yee
(74) *Attorney, Agent, or Firm*—Cohen, Pontani, Lieberman & Pavane

(57) ABSTRACT

A gray cast iron alloy for a friction element of a friction clutch, which may be brought into frictional contact with a clutch disk by a friction surface of the friction element, contains: 3.0–3.4 percent by weight C, 1.8–2.3 percent by weight Si, 0.4–0.8 percent by weight Mn, 0.0–0.35 percent by weight P, 0.0–0.125 percent by weight S, 0.4–0.6 percent by weight Mo, with the remainder comprising iron and production-related impurities and/or additives.

12 Claims, 1 Drawing Sheet

FRICTION CLUTCH COMPRISING A FRICTION ELEMENT FORMED OF FLAKE GRAPHITE ALLOY

BACKGROUND OF THE INVENTION

1. Field of the Invention

The present invention relates to a gray cast iron alloy for a friction element of a friction clutch and to a friction element formed from such an alloy.

2. Description of the Related Art

The demand for higher maximum transmittable torques in friction clutches used in modern motor vehicles is increasing because the drive units currently in use are capable of delivering very high torques. These comparatively high transmitted torques represent a considerable load on the various structural component parts of a friction clutch, particularly the cast structural component parts thereof. However, modern vehicles also require that the installation space for a friction clutch of this type be kept as small as possible, particularly also because torsional vibration dampers in the form of dual-mass flywheels or the like are often used in powertrains. As a result of the resulting smaller or weaker dimensioning of different cast structural component parts such as, for example, flywheels, problems such as breakage and cracks may occur due to the high thermal loading in friction operation.

Iron alloys that are used for producing flywheels or pressure plates in friction clutches include, for example, spheroidal graphite (SGI) alloys and vermicular graphite (CGI) alloys. These two types of cast iron alloys are relatively costly to produce and, moreover, are difficult to work with. Further, these materials have a high modulus of elasticity and a comparatively low thermal conductivity so that, as a result, a strong screen behavior is generated particularly by the heat occurring in friction operation. The uneven loading of the friction facings of the clutch disk which occurs due to the characteristics of these alloys generates uneven and excessive wear on the different structural parts which rub against one another and reduces the maximum torque which can be transmitted.

SUMMARY OF THE INVENTION

It is an object of the present invention to provide an alloy for a friction element of a friction clutch and a friction element produced from the same which have improved operating characteristics and that are simple to produce.

The object is met according to an embodiment of the present invention by a gray cast iron alloy for a friction element of a friction clutch having a friction surface arranged for frictional contact with a clutch disk, wherein the alloy contains:

3.0–3.4 percent by weight C;
1.8–2.3 percent by weight Si;
0.4–0.8 percent by weight Mn;
0.0–0.35 percent by weight P;
0.0–0.125 percent by weight S;
0.4–0.6 percent by weight Mo; and
a remainder comprising iron and production-related impurities and/or additives.

The use of a gray cast iron alloy (GCI), i.e., a cast iron alloy containing flake graphite, for a friction element used in a friction clutch produces a structural component part with appreciably higher thermal stability than the alloys used in the prior art. In addition, the introduction of the alloy constituent molybdenum increases the strength of the structural component part. In particular, the above-indicated weight-percent proportions of the different alloy constituents, carbon, silicon, manganese, phosphorus, sulfur and molybdenum, produces a structural component part which satisfies in an outstanding manner the requirements for such a structural component part in driving operation.

According to a further embodiment, the present invention provides a friction element for a friction clutch with a friction surface for frictional contact with a clutch disk, wherein the friction element is formed of the above-described alloy or which is formed of flake graphite.

The friction element may, for example, be a pressure plate of a friction clutch, a flywheel mass part of a friction clutch, a flywheel or part of a multi-mass flywheel, or an intermediate plate of a multidisk clutch. The multi-disk clutch may comprise a clutch disclosed in U.S. Pat. No. 6,276,505, the entire contents of which are enclosed herein by reference. To adapt a friction element produced from the alloy according to the invention to the respective requirements in an improved manner, the friction element may be subjected to stress-relief annealing at 450° C. to 600° C., preferably 500° C. to 550° C., for a period of at least 2.5 hours, preferably at least 3 hours after the friction element is cast in a casting process.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
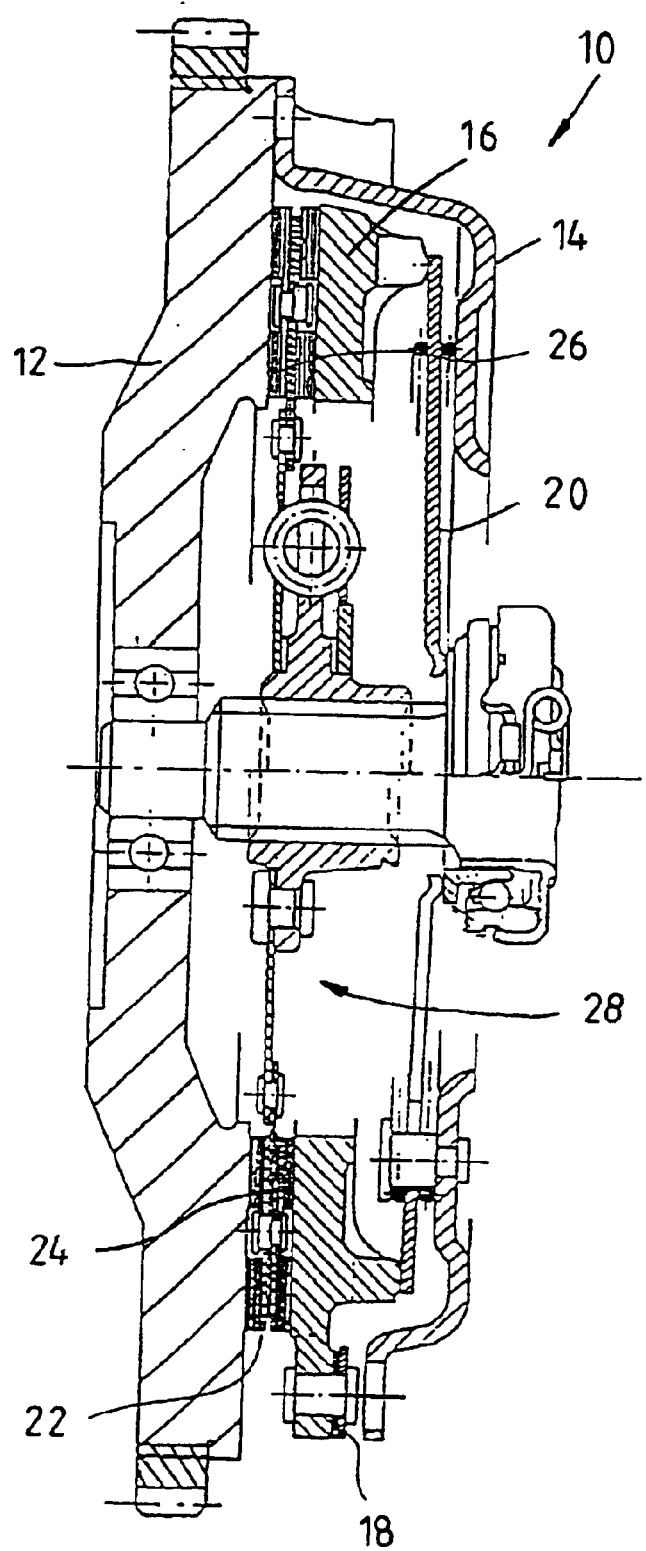
FIG. 1 is a friction clutch according to an embodiment of the present invention.

FIG. 1 shows a friction clutch 10 according to an embodiment of the present invention which includes a flywheel 12 and a clutch housing 14 connected to a radial outer area of the flywheel 12 so that the clutch housing 14 is fixed with respect to rotation relative thereto. A pressure plate 16 is arranged between the clutch housing 14 and the flywheel 12 and is connected with the clutch housing 14 by tangential leaf springs 18 such that the pressure plate 16 is fixed with respect to rotation and axially movable relative to the clutch housing 14. An energy accumulator 20 acts between the pressure plate 16 and the clutch housing 14. The energy accumulator 20 urges the pressure plate 16 against the friction facings 22 of a clutch disk 28. When a friction surface 24 of the pressure plate 16 acts at the friction facings 22, the friction surface 24 presses the friction facings 22 against a corresponding friction surface 26 on the flywheel 12.

In the friction clutch 10, a gray cast iron alloy is used in the area of the flywheel 12 and/or in the area of the pressure plate 16 as an alloy material for these structural component parts which are produced by casting, according to the present invention. This gray cast iron alloy preferably contains 3.0–3.4 percent by weight carbon, 1.8–2.3 percent by weight silicon, 0.4–0.8 percent by weight manganese, maximum 0.35 percent by weight phosphorus, maximum 0.125 percent by weight sulfur and 0.4–0.6 percent by weight molybdenum, in addition to iron and the impurities which unavoidably occur when carrying out casting processes, and other additives as the case may be. This results in an alloy which satisfies the requirements occurring in operation in an outstanding manner, particularly with respect to thermal loading. The friction elements, i.e., pressure plate 16 and flywheel 12, produced with an alloy of this kind may be stress-relief annealed after the casting process, for example, for a duration of at least 3 hours at 500 to 550° C., in order to further improve the special characteristics of this alloy, that is, the extensive hardness and strength, with good friction behavior and wear behavior and also with good damping or buffering capacity.

By using the alloy according to the present invention with the constituents indicated above, a gray cast iron, that is, cast iron with flake graphite, is obtained having a fine-pearlite basic structure with traces of ferrite. The produced structural component parts are substantially free from cementite or have traces of cementite of up to 5 percent by weight only in edge areas or in comparatively slender casting areas.

Of course, the gray cast iron alloy with flake graphite according to the present invention may also be applied in intermediate plates in multidisk clutches, that is, plates which are connected with the flywheel mass arrangement and clutch housing so as to be fixed with respect to rotation relative to the latter and which are located between the pressure plate and the flywheel. In this case, the friction facings of different clutch disks are located between pressure plate and intermediate plate on one side and intermediate plate and flywheel on the other side.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:
1. A friction clutch comprising a friction element having friction surface for frictional contact with a clutch disk, wherein said friction element is formed of flake graphite alloy comprising:
   3.0–3.4 percent by weight C;
   1.8–2.3 percent by weight Si;
   0.4–0.8 percent by weight Mn;
   0.0–0.35 percent by weight P;
   0.0–0.125 percent by weight S;
   0.4–0.6 percent by weight Mo; and
   a remainder comprising iron and production-related impurities and/or additives.
2. The friction clutch of claim 1, wherein said friction element comprises a pressure plate.
3. The friction clutch of claim 1, wherein said friction element comprises a flywheel mass part.
4. The friction clutch of claim 1, wherein said friction element comprises an intermediate plate of a multidisk clutch.
5. The friction clutch of claim 1, wherein said friction element is cast and stress-relief annealed at a temperature within a range including 450° C. to 600° C. for a period of at least 2.5 hours after casting.
6. The friction clutch of claim 5, wherein said friction element is stress-relief annealed at a temperature within a range including 500° C. to 550° C. for a period of at least 3 hours.
7. The friction clutch of claim 2, wherein said friction element is cast and stress-relief annealed at a temperature within a range including 450° C. to 600° C. for a period of at least 2.5 hours after casting.
8. The friction clutch of claim 7, wherein said friction element is stress-relief annealed at a temperature within a range including 500° C. to 550° C. for a period of at least 3 hours.
9. The friction clutch of claim 3, wherein said friction element is cast and stress-relief annealed at a temperature within a range including 450° C. to 600° C. for a period of at least 2.5 hours after casting.
10. The friction clutch of claim 9, wherein said friction element is stress-relief annealed at a temperature within a range including 500° to 550° C. for a period of at least 3 hours.
11. The friction clutch of claim 4 wherein said friction element is cast and stress-relief annealed at a temperature within a range including 450° to 600° C. for a period of at least 2.5 hours after casting.
12. The friction clutch of claim 11 wherein said friction element is stress-relief annealed at a temperature within a range including 500° C. to 550° C. for a period of at least 3 hours.

* * * * *